US012686404B2

(12) United States Patent
Nouri et al.

(10) Patent No.: US 12,686,404 B2
(45) Date of Patent: Jul. 21, 2026

(54) METHOD FOR MANAGING A USER DEMAND-BASED OPERATIONAL DESIGN DOMAIN EXPANSION FOR AN AUTOMATED DRIVING SYSTEM OF A VEHICLE

(71) Applicant: ZENSEACT AB, Gothenburg (SE)

(72) Inventors: Ali Nouri, Gothenburg (SE); Behnam Safakhah, Sävedalen (SE); Håkan Sivencrona, Jörlanda (SE)

(73) Assignee: ZENSEACT AB, Gothenburg (SE)

( * ) Notice: Subject to any disclaimer, the term of this patent is extended or adjusted under 35 U.S.C. 154(b) by 0 days.

(21) Appl. No.: 18/915,882

(22) Filed: Oct. 15, 2024

(65) Prior Publication Data

US 2025/0128729 A1 Apr. 24, 2025

(30) Foreign Application Priority Data

Oct. 23, 2023 (EP) .................................... 23205231

(51) Int. Cl.
| | |
|---|---|
| *B60Q 1/00* | (2006.01) |
| *B60W 50/00* | (2006.01) |
| *B60W 50/14* | (2020.01) |
| *B60W 60/00* | (2020.01) |

(52) U.S. Cl.
CPC ........ *B60W 50/14* (2013.01); *B60W 50/0097* (2013.01); *B60W 60/005* (2020.02);
(Continued)

(58) Field of Classification Search
CPC ............. B60W 50/14; B60W 50/0097; B60W 60/005; B60W 2050/146;
(Continued)

(56) References Cited

U.S. PATENT DOCUMENTS

| 9,683,852 B2 * | 6/2017 | Dong ..................... G01C 21/26 |
|---|---|---|
| 11,112,797 B2 * | 9/2021 | Bin-Nun ............. B60W 50/045 |

(Continued)

FOREIGN PATENT DOCUMENTS

| CN | 114354219 A | 4/2022 |
|---|---|---|
| KR | 20220139707 A | 10/2022 |
| KR | 102505533 B1 | 3/2023 |

OTHER PUBLICATIONS

Extended European Search Report mailed Apr. 5, 2024 for European PAtent Application No. 23205231.6, 9 pages.
(Continued)

*Primary Examiner* — Toan N Pham
(74) *Attorney, Agent, or Firm* — Sage Patent Group

(57) ABSTRACT

A method for managing user demand-based Operational Design Domain (ODD) expansion for an Automated Driving System (ADS) of a vehicle is presented. The method includes: requesting an ODD verification completion rate for each of a plurality of road segments by transferring a request from the vehicle to a remote server, obtaining road segment ODD status data, including the ODD verification completion rates, for the plurality of the road segments from the remote server, displaying, via a display apparatus, a graphical user interface (GUI) comprising: a graphical representation comprising: categorized road segments comprising at least road segments under ADS verification, wherein the categorized road segments include the plurality of road segments categorized based on the road segment ODD status data, and guide marks associated with a sub-set of the road segments under ADS verification, wherein one defining criteria for the sub-set is an ODD verification completion rate range.

15 Claims, 5 Drawing Sheets

(52) U.S. Cl.
CPC . *B60W 2050/146* (2013.01); *B60W 2540/043* (2020.02); *B60W 2540/215* (2020.02); *B60W 2555/20* (2020.02); *B60W 2556/40* (2020.02)

(58) Field of Classification Search
CPC ..... B60W 2540/043; B60W 2540/215; B60W 2555/20; B60W 2556/40; B60W 50/00; B60W 60/001; G01C 21/3415; G01C 21/3461; G06Q 10/047; G06Q 30/018; G06Q 30/0207; G06Q 50/40; G08G 1/096822; G08G 1/096844; G08G 1/0969
See application file for complete search history.

(56) References Cited

U.S. PATENT DOCUMENTS

| | | | |
|---|---|---|---|
| 11,385,656 | B2 | 7/2022 | Garcia et al. |
| 11,892,306 | B2 * | 2/2024 | Kuo ..................... G08G 1/0133 |
| 12,037,020 | B2 * | 7/2024 | Koopman, Jr. .......... G06N 7/01 |
| 12,272,188 | B2 * | 4/2025 | Maheswari ......... G06F 11/3684 |
| 2017/0203770 | A1 | 7/2017 | Kondo |
| 2021/0149395 | A1 | 5/2021 | Jonsson et al. |
| 2021/0223788 | A1 | 7/2021 | Garcia et al. |
| 2022/0178710 | A1 | 6/2022 | Panahandeh |

OTHER PUBLICATIONS

Pappalardo, Giuseppina et al.; "Assessing the operational design domain of lane support system for automated vehicles in different weather and road conditions"; Journal of Traffic and Transportation Engineering (English Edition), vol. 9, No. 4; May 12, 2022; pp. 631-644 (14 pages).

* cited by examiner

200

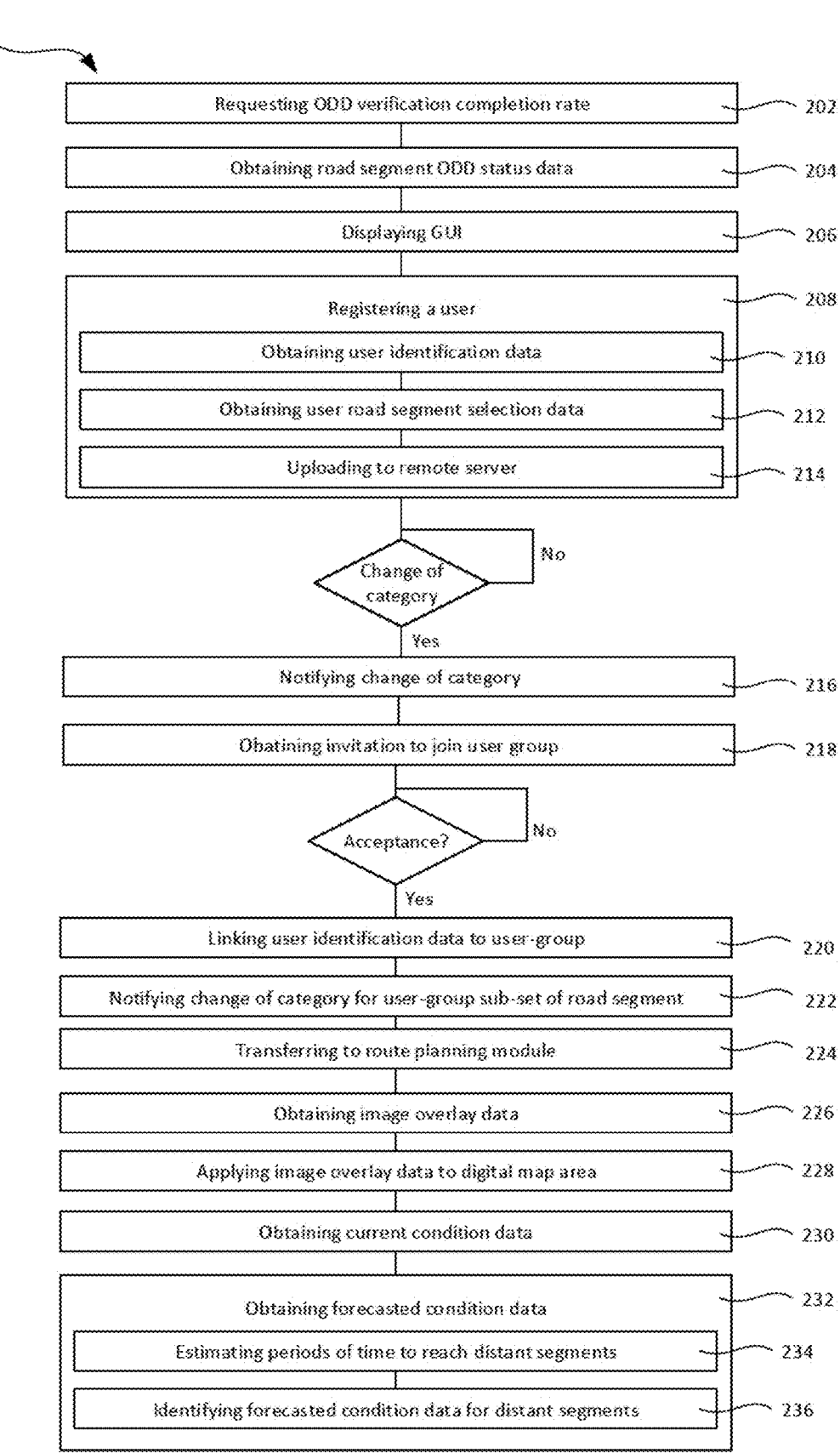

Requesting ODD verification completion rate — 202

Obtaining road segment ODD status data — 204

Displaying GUI — 206

Registering a user — 208

Obtaining user identification data — 210

Obtaining user road segment selection data — 212

Uploading to remote server — 214

Change of category — No

Yes

Notifying change of category — 216

Obataining invitation to join user group — 218

Acceptance? — No

Yes

Linking user identification data to user-group — 220

Notifying change of category for user-group sub-set of road segment — 222

Transferring to route planning module — 224

Obtaining image overlay data — 226

Applying image overlay data to digital map area — 228

Obtaining current condition data — 230

Obtaining forecasted condition data — 232

Estimating periods of time to reach distant segments — 234

Identifying forecasted condition data for distant segments — 236

Control circuitry
402

Processor
404

Transceiver
408

Memory
406

Requesting
function
408

Obtaining function
410

Displaying
function
412

METHOD FOR MANAGING A USER DEMAND-BASED OPERATIONAL DESIGN DOMAIN EXPANSION FOR AN AUTOMATED DRIVING SYSTEM OF A VEHICLE

CROSS-REFERENCE TO RELATED APPLICATIONS

The present application for patent claims priority to European Patent Office Application Ser. No. 23205231.6, entitled "A METHOD FOR MANAGING A USER DEMAND-BASED OPERATIONAL DESIGN DOMAIN EXPANSION FOR AN AUTOMATED DRIVING SYSTEM OF A VEHICLE" filed on Oct. 23, 2023, assigned to the assignee hereof, and expressly incorporated herein by reference.

TECHNICAL FIELD

The disclosed technology relates to methods and systems for managing user demand-based Operational Design Domain (ODD) expansion for an Automated Driving System (ADS) of a vehicle. In particular, but not exclusively the disclosed technology relates to provide a platform for allowing users to align efforts in geographical ODD expansion.

BACKGROUND

Automated Driving Systems (ADS) is being developed at impressive speeds and many cars, trucks and other vehicles produced today are equipped at least to some degree with automated driving system (ADS) functionality. In the following, ADAS and AD are referred to under the common term Automated Driving System (ADS) corresponding to all of the different levels of automation as for example defined by the SAE J3016 levels (0-5) of driving automation.

Today, most ADS functions/features being deployed are on level 0 and 1, that is, the ADS issues warnings and may momentarily intervene, and the driver and vehicle is sharing control. A well-known example of a level 1 ADS function/feature is adaptive cruise control. It can be expected that ADS will continue to be important and also that the ADS will be developed further and deployed at larger scale in the not so distant future. For instance, within a couple of years it can be expected that the ADS functions/features on level 2 or 3, that is, so-called "hands off" systems, the vehicle is accelerating, braking and steering under the supervision of the driver, will be deployed on a large scale.

A key factor for being able to provide an ADS function/feature, in particular on level 2 and above, is to have access to information describing the roads. Even though a sensor system of the vehicle provides information on the road close to the vehicle, improved ADS may be provided if the ADS is not only relying on sensor data obtained via the sensor system of the vehicle, but also from other sensor systems external to the vehicle. For instance, in case information about road condition is provided to the vehicle via a remote server, the vehicle may well in advance slow down or in any other ways compensate for obstacles placed down the road. Having such set up in place may provide for that potholes can be compensated for by having the vehicle changing lane well in advance before the pot holes occur in front of the vehicle.

One way to collect data for ADSs is to have vehicles sharing the sensor data they have collected such that ADS models may be improved. As an effect, the vehicles can benefit from sensor data collected by a large pool of vehicles and not only by the sensor data collected by the vehicle's own sensor system. Since different road segments may have different properties as well as different coverage in terms of sensor data collected, different road segments may differ in terms of ADS capability. For instance, a gravel road segment with very few cars passing may not have the sensor data needed for the ADS to operate safely. Hence, an ADS-equipped car driving on this gravel road segment may require the driver to control steering, accelerating and braking. On the other hand, a highway road segment with thousands of cars passing every hour may be certified for high level ADS functionality (e.g., level 4 or 5 ADS), i.e. allow the ADS-equipped car to steer, brake and accelerate with only the driver monitoring operation. In this context, to define to which extent the road segment is enabled for a certain ADS function/feature, it is common to refer to Operational Design Domains (ODDs).

Even though there are solutions available for how to collect the sensor data and how to measure ODD completion rates, there is a drawback in that some road segments will not have enough sensor data collected with the result that these are not be opened up for certain ADS functions/features. The effect of this is that the driver has to be involved for controlling the car when passing these segments, which may negatively affect the travelling experience.

SUMMARY

The herein disclosed technology seeks to mitigate, alleviate or eliminate one or more of the above-identified deficiencies and disadvantages in the prior art to address various problems relating to that there is a risk that road segments being ADS certified road segments, i.e. road segments opened up for ADSs, will be used extensively while road segments under ADS verification, i.e. road segments eligible for ADS, and in particular for level 3, 4, or 5 ADS functions/features, but not having sufficient sensor data collected, are under-utilized with the effect that an ODD expansion is restricted to a few road segments and also that a road network is not utilized to its full potential. The disclosed technology also seeks to provide a method and an apparatus for enabling user demand-based ODD expansion, that is, providing means for drivers, or users, to take part in and affect how the ODD verification efforts are steered in terms of geographical expansion as well as road type expansion.

As indicated above, the ODD may relate to the amount of data collected for a specific road segment. By way of example, it may be required to have sensor data collected from hundreds of vehicles travelling the road segment to have this ADS enabled, and in particular AD (i.e., ADS level 3, 4, or 5) enabled. The ODD may also, or instead, relate to features of the specific road segment. For instance, the specific road segment may be a gravel road segment without lane markings. In this way, the ODD, as defined herein, may refer both to that there is sufficient sensor data collected related to the specific road segment to have this segment ADS-enabled, and to that there is sufficient sensor data collected for a type of the specific road segment. Put differently, the ODD may, as defined herein, be used for defining a geographical domain in which there is sufficient sensor data for enabling a functionality, such as autonomous driving, and it may also be used for defining a type of domain, that is, which types of roads for which there is sufficient sensor data for enabling functionality.

The geographical expansion and the road type expansion mentioned above may result in that road segments are ADS enabled short term, but the expansions are in this context not limited to ADS enabling and also not only to short term, e.g. having the road segment enabled for ADS after sensor data collection during 1000 travels or less. The road type expansion may for instance be made solely for R&D purposes. For instance, in case the existing databases used by R&D engineers for test purposes do not contain or contain only a limited data set of sensor data collected from vehicles travelling on gravel roads, in night conditions, in storm and in frost conditions, it may be suggested to the user to choose a route encompassing such road segment to be able to add sensor data to the databases used by the R&D engineers such that the databases coverage can be improved.

ADS should be interpreted broadly. In addition to encompass self-driving vehicles, these expressions should also be understood to encompass systems involving human interaction. For instance, ADS should be understood to encompass so-called advanced driver-assistance systems, ADAS as well as Autonomous Driving (AD).

Various aspects and embodiments of the disclosed invention are defined below and in the accompanying independent and dependent claims.

A first aspect of the disclosed technology comprises a computer-implemented method for managing user demand-based Operational Design Domain expansion for an Automated Driving System (ADS) of a vehicle. The method comprises requesting an ODD verification completion rate for each of a plurality of road segments by transferring a request from the vehicle to a remote server, obtaining road segment ODD status data, including the ODD verification completion rates, for the plurality of the road segments from the remote server, and displaying, via a display apparatus, a graphical user interface (GUI). The GUI comprises a graphical representation comprising categorized road segments comprising at least road segments under ADS verification, wherein the categorized road segments comprise the plurality of road segments categorized based on the road segment ODD status data, and guide marks associated with a sub-set of the road segments under ADS verification, wherein one defining criteria for the sub-set is an ODD verification completion rate range.

A second aspect of the disclosed technology comprises an apparatus for managing user demand-based Operational Design Domain (ODD) expansion for an Automated Driving System (ADS) of a vehicle. the apparatus comprises control circuitry configured to request an ODD verification completion rate for each of the plurality of road segments by transferring a request from the vehicle to a remote server, obtain road segment ODD status data, including the ODD verification completion rates, for the plurality of the road segments from the remote server, and display, via a display apparatus, a graphical user interface (GUI). The GUI comprises a graphical representation of the digital map area comprising categorized road segments comprising at least road segments under ADS verification, wherein the categorized road segments comprise the plurality of road segments categorized based on the road segment ODD status data, and guide marks associated with a sub-set of the road segments under ADS verification, wherein one defining criteria for the sub-set is an ODD verification completion rate range. With this aspect of the disclosed technology, similar advantages and preferred features are present as in the other aspects.

Another aspect of the disclosed technology comprises a computer program product comprising instructions which, when the program is executed by a computing device of a vehicle, causes the computing device to carry out the method according to any one of the embodiments disclosed herein. With this aspect of the disclosed technology, similar advantages and preferred features are present as in the previously discussed aspects.

Another aspect of the disclosed technology comprises a (non-transitory) computer-readable storage medium comprising instructions which, when executed by a computing device of a vehicle, causes the computing device to carry out the method according to any one of the embodiments disclosed herein. With this aspect of the disclosed technology, similar advantages and preferred features are present as in the previously discussed aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Another aspect of the disclosed technology comprises a vehicle comprising an Automated Driving System (ADS) and an apparatus according to any one of the embodiments disclosed herein. With this aspect of the disclosed technology, similar advantages and preferred features are present as in the previously discussed aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

An advantage of some embodiments is that a geographical ODD expansion for ADS-equipped vehicles may be completed at a faster pace.

An advantage of some embodiments is that there is provided a guided human-machine interaction to assist the user to control the vehicle so to collect relevant sensor data and facilitate geographical ODD expansion for ADS-equipped vehicles.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which:

FIG. 2 is a schematic flowchart of a computer-implemented method for managing user demand-based ODD expansion for an ADS of a vehicle in accordance with some embodiments.

DETAILED DESCRIPTION

Figure 1:
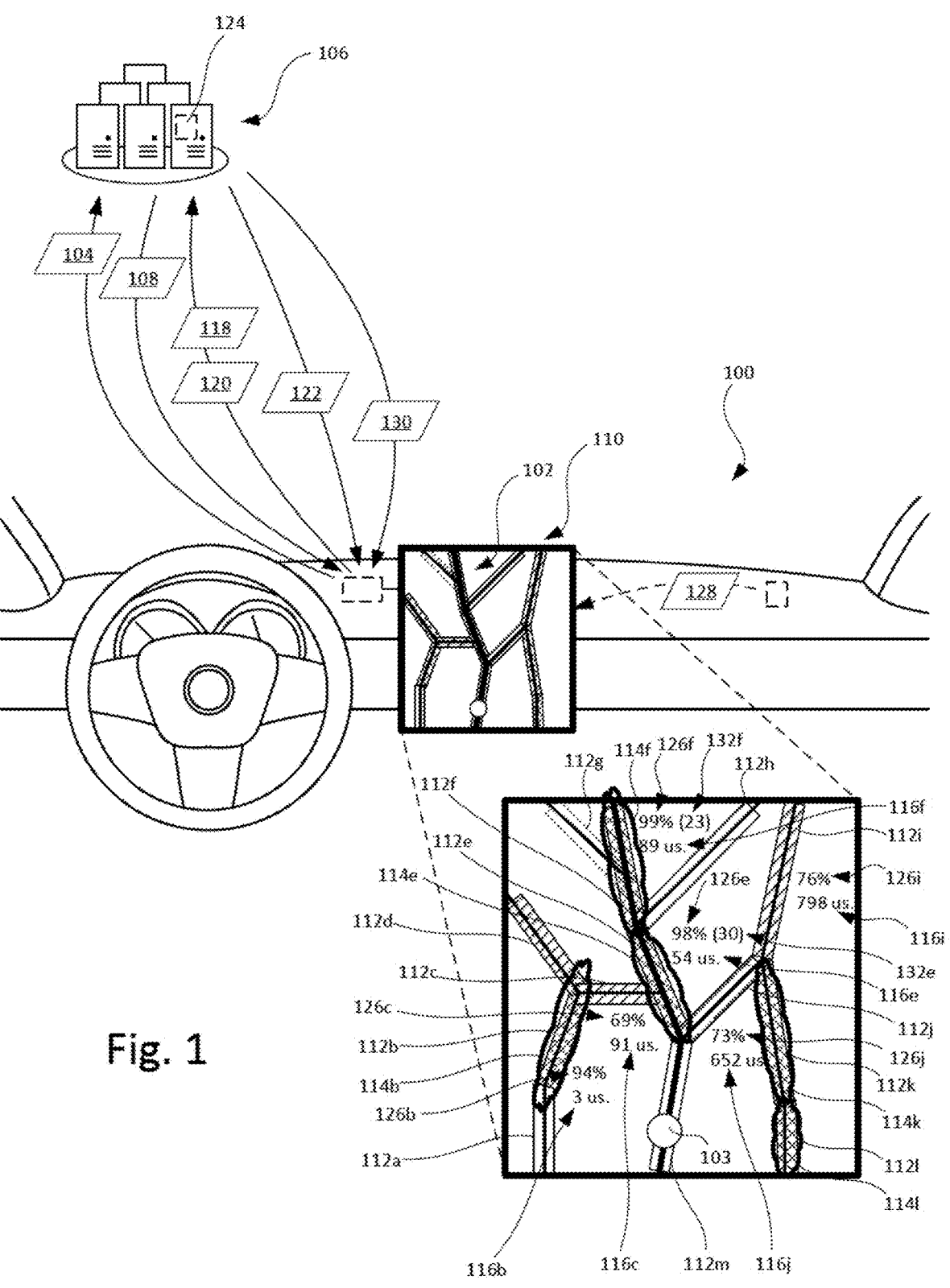
FIG. 1 is a schematic illustration of a vehicle having a display apparatus for managing an Operational Design Domain (ODD) expansion for an Automated Driving System (ADS) in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general-purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative. Similarly, "at least one of A, B and C" is to be interpreted as only A, only B, only C, both A and B, both A and C, both B or C, or all of A, B, and C.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

Before going into detail of the examples of embodiments of the presently disclosed technology, a number of terms and wordings will now be explained for improved understanding.

The wording "automated driving system" is herein used as a common term for all features related to the control and operation of the autonomous part of an "autonomous" or "semi-autonomous vehicle". The ADS can comprise different ADS features (may also be referred to as ADS functions). The ADS may comprise any advanced driver-assistance system (ADAS) functions/features and/or Autonomous Driving (AD) functions/features. Thus, the ADS feature may correspond to any automation level 0-5 according to SAE J3016 levels of driving automation for on-road vehicles. Preferably, in the context of the presently disclosed technology, the ADS features of the vehicle are level 3 features or higher. The ADS feature may for example be a traffic jam pilot, a highway pilot, or any other SAE J3016 level 3+ ADS feature. In some embodiments, the ADS function/feature is an AD function or feature. However, the principles of the present disclosure may also be applicable to lower level ADS features, such as a lane-change assist feature, lane keeping assist feature (e.g. using map data), or an adaptive cruise control feature.

In order for an automated driving system (ADS) to be allowed to operate, a plurality of predefined "safety requirements" must be fulfilled. The predefined safety requirements being fulfilled may ensure e.g. that a risk of an incident or harm to anyone or to anything is below an acceptable level. For example, a safety requirement may specify that the vehicle should be able to come to a stop within a certain distance depending on a certain speed. As another example, a safety requirement may specify that the vehicle should not collide with a pedestrian at a speed above a threshold, or not at all when travelling at speeds below another threshold. The safety requirements may be formulized as constraints for a plurality of "component capabilities" of the ADS. In other words, capabilities of a plurality of components of the ADS must fulfil certain requirements in order to ensure that the safety requirements are met.

The wording "component capability" as used herein should be interpreted as a value of the capability of a component of the ADS, or the vehicle as a whole, given certain operating conditions. As an example, a component capability of a sensor may relate to a detection range in different operating conditions. As another example, a component capability of a brake system may relate to a braking distance for different road conditions. The component capability may relate to both external and internal conditions. As an example of external conditions, a sensor range may be limited due to visibility of the surrounding environment, e.g. due to weather conditions. As an example of internal conditions, the sensor range may be limited due to the sensor's hardware or a health status of the sensor. The component capability may further be relate to both software and hardware limitations. Software limitations may e.g. be related to connectivity either between components within the vehicle or to external elements. A connectivity between a GPS of the vehicle and a number of satellites could for instance affect a localization algorithm of the ADS. Examples of hardware limitations may for instance be how rain can affect the detection range of a sensor, or an upper limit on a brake capacity of a brake system. By the wording "component", it is herein meant any elements or actuators of the vehicle or ADS such as sensors, brake system, steering system, throttle system, communication systems, etc. and also any other more "high-level" features or functions of the ADS such as e.g. a path planner module, an object detection module, a free-space estimation module, a minimum risk maneuver module, etc. The safety requirements which are to be met may be formulated at a general level, such as the examples given above. Alternatively, the safety requirements may be formulated at a component level such that each component has one or more component requirements. A "module" of the ADS may in the present context be understood as a software and/or hardware component of the ADS configured to cause the ADS to execute a function (e.g. detect objects in an image, generate paths to be executed by the vehicle, generate control signals to one or more actuators of the vehicle, etc.) of the ADS.

The "Operational Design Domain" (ODD) is to be understood as a domain in which an automated driving system (ADS), or a function/feature thereof, is allowed to operate. If the vehicle is within the ODD, the ADS is "allowed to operate" in the sense that it fulfils the plurality of safety requirements. In particular, the ODD comprises a plurality of "ODD conditions" that are related to an environment of the vehicle and that the ADS is configured to handle in order to operate the vehicle safely in the environment. In reference to the ADS functions, this may be understood as specific ADS functions or features, such as e.g., highway pilots, traffic jam pilots, automated valet parking, lane change assist, lane keeping assist, etc. Moreover, the ADS functions may be associated with different ODDs such that one function (e.g., highway pilot) is designed and verified for a first ODD, while another function (e.g., traffic jam pilot) is designed and verified for a second, different, ODD. In the following, when it is stated that something is "ADS verified" or "ADS certified", it may be understood as that something is verified or certified for one or more ADS functions/features. The ODD conditions may relate to any parameters of the driving environment of the vehicle. For example, the plurality of conditions may comprise at least one of weather conditions, visibility in the surrounding environment, road condition parameters, driving scenario parameters, geographic data parameters, map data parameters, presence of Vulnerable Road Users (VRUs), connectivity parameters, and surrounding object parameters. Fulfilling the plurality of conditions of the ODD may ensure fulfilment of the plurality of safety requirements. Put differently, the ODD may be seen as a transformation of the safety requirements into conditions on the environment of the vehicle in relation to the component capabilities which are to be fulfilled to ensure that the ADS can operate safely. In other words, if the vehicle is outside the ODD, it may no longer be possible to ensure that the safety requirements are fulfilled. In general, the ODD conditions that are to be fulfilled for a specific ADS function/feature are defined in design-time.

The environment of the vehicle may be defined by a plurality of "scenario parameters". Put differently, the environment of the vehicle may be formulized by the plurality of scenario parameters. Each scenario parameter of the plurality of scenario parameters may correspond to a respective ODD condition. The plurality of scenario parameters may thus comprise at least one of weather conditions, visibility in the surrounding environment, road condition parameters, driving scenario parameters, geographic data parameters, map data parameters, presence of Vulnerable Road Users (VRUs), connectivity parameters, and surrounding object parameters. However, an ODD condition may specify requirements on a combination of several scenario parameters. Thus, the scenario parameters are run-time parameters that the ADS/vehicle is exposed to, while the ODD conditions are design-time parameters onto which one can map the scenario parameters.

The wording "variable state parameters" as used herein, should be interpreted as any adjustable parameter of the ADS or the vehicle. In particular, the variable state parameters should be seen as any parameters relating to the operation of the vehicle, and which could be adjusted in order to find an allowable degraded mode (as is further explained below). The variable state parameters of the ADS may for example comprise at least one of a vehicle speed, automated lane change allowableness, distance to lead vehicle, steering angle, steering angle rate, brake level, acceleration level, acceleration and brake rate, lane choice, allowability of certain turns, overtakes, lateral distance to objects, closeness to lane markers or road edge.

FIG. 1 generally illustrates a dashboard of a vehicle 100 having a display apparatus 110. The display apparatus 110 may as illustrated form part of the dashboard and be part of the vehicle 100, but is equally possible that the display apparatus 110 is a separate piece of equipment communicatively connected to the vehicle 110. On the display apparatus 110, a graphical user interface (GUI) comprising a graphical representation may be provided. This graphical representation can comprise a plurality of road segments 102. As illustrated, the road segment 102 being displayed may include road segments being close to a vehicle position 103. The plurality of road segments 102 may however not necessarily be road segments close to the vehicle position 103 as illustrated, but can be road segments close to any position.

To receive information about the ODD completion rates for the different road segments 102 being displayed, a request 104 may be transferred from the vehicle 100 to a remote server 106. The remote server 106 may be communicatively connected to a large pool of vehicles, and may also be provided with processors and memories such that the sensor data retrieved from different vehicles in different locations can be processed as well as stored. In response to the request 104, road segment ODD status data 108 may be transferred from the remote server 106 to the vehicle 100. After obtaining this data 108, the graphical representation may be amended/updated based on this data 108.

Before amending/updating the graphical representation, the road segment ODD status data 108 may be combined with the road segments 102 such that categorized road segments 112*a-m* are generated. For instance, the road segments 102 may be divided into different categories based on the ODD completion rate, which is reflected in the road segment ODD status data 108. For instance, the categorized road segments 112*a-m* may constitute two different categories, namely ADS certified road segments 112*a,h,m* and road segments under ADS verification 112*b-f, i-l*, i.e. road segments in which ADS operation is possible and road segments in which ADS operation is not possible (or at least not possible at the moment). In some cases, a third category may be added, namely non-eligible ADS road segments 112*g*. An example of such road segment may be a road segment in an area where cameras, microphones and other sensors for capturing information about the surrounding environment are not allowed, e.g. a nuclear power plant area or other high security area.

The road segments under ADS verification 112*b-f,i-l* may comprise one or several sub-categories, also referred to as sub-sets. For instance, as illustrated, a sub-set 112*b,c,f,k,l* of the road segments under ADS verification 112*b-f,i-l* may have ODD verification completion rates in an upper range, and another sub-set 112*c,d,i,j* may have the ODD completion rates in a lower range, wherein the upper range is above the lower range. Put differently, the subset 112*b,c,f,k,l* of the road segments with the ODD verification completion rates are closer to being ADS certified road segments, i.e. considered to have the sensor data coverage needed for allowing ADS operation, than the other sub-set 112*c,d,i,j*. The sensor data coverage may in this context be understood as that there is sufficient data collected for confirming ADS functionality, i.e. that the ADS functionality is performing as expected. Several defining criteria may be used for defining such sub-sets. One such criteria may be the ODD verification completion rate range. As illustrated, the different road segments may be represented in different ways in the graphical representation such that the driver easily can tell them apart. Thus, by not only providing the driver, or user, with information about which of the road segments 102 that are ADS certified or not, but with information about the ODD completion rates of the different road segments, it is made possible for the driver to take an active role and be part of deciding how efforts are steered in terms of geographical ODD expansion.

For instance, in case the driver is particularly interested in having a certain road segment ADS certified, he or she may choose a route comprising this segment, even though being a detour, up until this road segment is ADS certified. There may be different reasons for that the driver is interested in having this segment ADS certified. One such reason may be that he or she would like to be part of making it possible for services involving autonomous vehicles, i.e. driverless vehicles, to be accessible to a certain area. By way of example, such service may be a food delivery service involving driverless vehicles. Another reason the driver may want to have this certain road segment ADS certified may be that this would open up for additional ADS certified routes between two locations. By having additional alternatives in terms of ADS certified routes and provided that ADS certified routes are a preferred option for a majority of drivers, a risk of traffic congestion between these two locations could be reduced. Different types of benefits may be linked to choosing this certain road segment. For instance, a company interested in being able to offer services using self-driving vehicles in a certain area may offer gift cards, reduced subscription fees, or other incentives to drivers choosing to drive on road segments in this certain area such that these are moving closer to be ADS certified.

To facilitate for the user to identify the sub-set 112*b,e,f,k,l* of the road segments under ADS verification, guide marks 114*b,e,f,k,l* may be linked to the road segments of this sub-set in the graphical representation. The guide marks 114*b,e,f,k,l* may be provided in a variety of forms and colours. In the example illustrated, the sub-set 112*b,e,f,k,l* comprises the road segments having ODD verification completion rate ranges in the upper range and the guide marks are provided as cloud-shaped marks placed around the road segments of this sub-set.

To make it possible for the driver to learn if there are other users interested in a specific road segment, information related to a number of users 116*b,c,e,f,j* linked to different road segments may be made available via the graphical representation. The information may, as illustrated, be made available by that the number of users is represented by numbers in the graphical representation. There may however be other examples on how this information can be conveyed, e.g. by using different shading on the different road segments, or by using different colours. Having the information about the number of users linked to different road segments may be helpful for the driver in deciding how to contribute to the ODD expansion. For instance, by making information about the number of users linked to different road segments available via the graphical representation, it is made possible for the users to steer efforts towards a few road segments such that there is at least one route, involving one or more segments, between two locations that is ADS certified.

One way of making it possible to link users to the road segments is to obtain user identification data 118 and user road segment selection data 120 via the GUI or other electronic means. The user identification data 118 may be obtained directly or indirectly. One way of indirectly obtaining the data is by making use of the user identification data linked to a mobile phone, a key card or the like that may already be used for e.g. automatically adjusting vehicle settings according to the user's preferences. The user road segment selection data 120 may be obtained by that the user is selecting road segments via the display apparatus 110, which may be touch sensitive and/or voice controlled. It is also possible to obtain the user road segment selection data 120 by using different tools provided with e.g. filtering functionality. By way of example, the user may select road segments by defining an area via the graphical representation and selecting all road segments within this area meeting a certain filtering criteria. It is further an option, to select road segments by making use of another user's or other users' selection(s). Once having obtained the user identification data 118 and the user road segment selection data 120, this can be uploaded to the remote server 106.

Once the link between the user identification data 118 and the user road segment selection data 120, being linked to one or more road segments 102 is made, a notification may be issued to the user, or driver, via the mobile phone linked to the user or via the graphical representation of the GUI if there is a change of category for one of the road segments linked to the user identification data 118. For instance, in case one of the road segments that the user is active in verifying is changing from being a road segment under ADS verification to an ADS verified road segment, a message or other notification may be sent to the user.

Instead of having the user actively seeking out how different users are linked to different road segments, it is made possible to form user groups. These groups can be formed in different ways. For instance, a group may be formed by an individual user that sees an opportunity to have certain road segments ADS verified more efficiently if a number of users collaborate. Alternatively, the user group may be formed as a result of a software program recognizing that there may be a benefit from an ODD expansion perspective if the number of users collaborate. Who to invite to the user group may be manually done. For instance, the individual user that starts the group may invite friends and family to join his or her group. In case the user group is automatically generated by the software program, the users invited to the group may be selected based on a number of selection criteria, e.g. the users being selected may historically have been driving close to or on the road segments linked to the user group. If being selected for being invited to the user group, an invitation 122 to join may be transferred from the remote server 106 to the vehicle 100 or to a device linked to the user, e.g. a mobile phone. If accepting the invitation 122, the driver, or user, may be linked to not only the road segments identified via the user road segment selection data 120, but also to a user-group sub-set of the road segments. In case one of these road segments is subject to a change of category, a notification may be provided to the user, e.g. by updating the graphical representation or sending a text message to the user's mobile phone.

The different user groups can be associated to chat forums or social media platform such that achievements, news etc can be shared within the group. It is also possible to add statistics to make it possible to follow contributions made by individual users and/or by different user groups. It is also possible for food delivery services or the like to make posts and/or requests for users to focus on certain areas such that more road segments in that area is ADS certified.

The road segment selection data 120 and the user identification data 118 may be provided to a route planning module 124, herein illustrated to form part of the remote server 106. By providing the route planning module 124 with information about the road segments deemed relevant by the user and/or the user identification data 118 such that this information can be obtained from databases comprising information about different user groups, it is made possible for the route planning module 124 to provide route alternatives chosen based on ODD expansion preferences of the user. For instance, the route planning module 124 may be configured to provide a shortest distance route alternative, a fastest route alternative, a most energy efficient alternative as well as an ODD expansion route alternative. The latter alternative may be determined by having as many of the road segments constituting this route coincide with as many as possible of the road segments of the user road segment selection data 120 and/or the user-group sub-set of road segments linked to user groups linked to the user identification data 118. To provide for that the ODD expansion route alternative is a viable option, it may be conditioned that this alternative should not exceed a detour threshold, e.g. there may be a limit in time and/or in distance on how much this alternative can differ from the shortest distance alternative and/or the fastest route alternative.

In case digital map data and the ODD verification completion rates for different road segments are retrieved from different sources, image overlay data based on the ODD verification completion rates may be obtained and, once this is obtained, this image overlay data may be applying onto the digital map such that an ODD verification progress map data is provided. In this way, information about the ODD completion rates for the road segments may be held separate and in this way be combined with map data provided by a large variety of map providers.

The ODD verification completion rates may be different for different conditions. For instance, one road segment may be ADS verified for daylight, non-rain, non-freezing conditions, but may be under ADS verification for night, non-rain, non-freezing conditions as well as daylight, rain, non-freezing conditions. Thus, by taking the conditions into account the number of categories may be increased and each of these categories may have its own ODD verification completion rate. Information about the conditions may be retrieved via a sensor system of the vehicle 100 and provided in the form of current condition data 128. It is also possible to have the current condition data 128 provided from the remote server 106. Different sub-sets of the condition data 128 may be provided via the sensor system of the vehicle 100 and the remote server 106. For instance, rain conditions may be provided by the sensor system of the vehicle while wind conditions may be provided via the remote server 106, which in turn may receive this information from a weather information service provider that has access to data from wind sensors placed at different locations. It is also possible that the same sub-set of the condition data is provided from both the sensor system of the vehicle and the remote server. For instance, temperature conditions may be provided both locally (via the sensor system of the vehicle) and remotely (via the remote server).

The remote server 106 may also provide forecasted condition data 130, that is, condition data forecasted to take place at a future point of time. The forecasted condition data 130 may comprise condition data linked to several future points of time, and just as the condition data 128, this may comprise different sub-sets related to different condition types, e.g. temperature, wind and rain. A benefit of having access to the forecasted condition data 130 is that, if planning a route for a trip that most likely may involve different conditions at different points of time, when in time it can be expected to reach different road segments along the route can be determined, and after doing so, the conditions to expect when reaching the different road segments can be determined by using the forecasted condition data 130.

As a complement to the ODD verification completion rates 126$b,c,e,f,i,j$, which may be expressed in terms of percentage, or as an alternative thereto, the graphical representation may comprise a number of trips 132$e,f$ with the vehicle 100 that is required along this road segment, under the conditions being reflected in the graphical representation, that is estimated to be required to have this road segment transformed from being a road segment under ADS verification to a road segment being ADS certified.

FIG. 2 is a flowchart illustrating a method 200 for managing user demand-based ODD expansion for the ADS of the vehicle 100. The method 200 is preferably a computer-implemented method 100, performed by a processing system of the vehicle. The processing system may for example comprise one or more processors and one or more memories coupled to the one or more processors, wherein the one or more memories store one or more programs that perform the steps, services and functions of the method 100 disclosed herein when executed by the one or more processors.

The method 200 may comprise requesting 202 an ODD verification completion rate for each of the plurality of road segments 102 by transferring the request 104 from the vehicle 100 to the remote server 106. The method may further comprise obtaining 204 the road segment ODD status data 108, including the ODD verification completion rates, for the plurality of the road segments 102 from the remote server 106. Once obtained this information, the method may comprise displaying 206, via the display apparatus 110, the GUI comprising: a graphical representation comprising: the categorized road segments 112$a$-$m$ comprising at least road segments under ADS verification 112$b$-$f$, $i$-1, wherein the categorized road segments 112$a$-$m$ comprise the plurality of road segments 102 categorized based on the road segment ODD status data 108, and the guide marks 114$b,e,f,k,l$ associated with the sub-set 112$b,e,f,k,l$ of the road segments under ADS verification 112$b$-$f$, $i$-1. One defining criteria for the sub-set 112$b,e,f,k,l$ may be an ODD verification completion rate range. The categorized road segments may further comprise automated driving ADS certified road segments 112*a,h,m*.

As described above, links may be formed between users and different road segments. In this way, it is made possible for the user to identify road segments that are relevant for him or her to have ADS certified. With respect to this aspect, the method 200 may further comprise: registering 208 the user to at least one road segments of the plurality of road segments by obtaining 210 the user identification data 118, and obtaining 212 the user road segment selection data 120. The user road segment selection data 120 may pertain to the at least one road segment of the plurality of road segments 102. After having obtained this information, the method 200 may further comprise uploading 214 the user identification data 118 and the user road segment selection data 120 to the remote server 106.

In case one of the at least one road segment of the plurality of road segments 102 linked to the user road segment selection data 120 is subject to a change of category, the method 200 may further comprise notifying 216 the change of category by updating the graphical representation so to reflect the change of category. As an alternative or as a complement to updating the graphical representation, the change of category may be communicated to the user via a mobile phone or other device linked to the user identification data.

Further, the method 200 may comprise obtaining 218 the invitation 122 to join the user group, wherein the user group may be linked to the user-group sub-set of the road segments under ADS verification. In case the invitation 122 is accepted, the method 200 may comprise linking 220 the user identification data 118 to the user group. Further, in case one of the user-group sub-set of road segments linked to the user group is subject to a change of category, the method 200 may comprise notifying 222 the change of category by updating the graphical representation so to reflect the change of category. Also for this case, the information may be provided to the user via the mobile phone or other device linked to the user identification data.

The method may further comprise transferring 224 the user road segment selection data 120 together with the user identification data 118 to the route planning module 124 such that route planning performed by the route planning module 124 is at least partly based on the user road segment selection data 124. As described above, according to one example, this may result in that the user, when using the route planning module 124, may be provided with at least one ODD expansion route alternative.

To provide for that the ODD verification completion rates may be combined with third party map data or map data provided to the display apparatus 110 in isolation, the method may comprise obtaining 226 the image overlay data based on the ODD verification completion rates for each of the road segments under ADS verification, and applying 228 the image overlay data to the digital map area such that the ODD verification progress map area can be provided, wherein the ODD verification progress map area is the map area combined with the image overlay data.

As described above, the road segment ODD status data 108 may comprise ODD verification completion rates 126*b, c,e,f,i,j* for different conditions, such as wind conditions, rain conditions, light conditions and temperature conditions. Taking this into account, the method may further comprise obtaining 230 the current condition data 128 from the vehicle 100 and/or the remote server 106, wherein nearby road segments of the road segments 102 are categorized as the ADS certified road segments and/or the road segments under ADS verification based on a combination of the ODD status data 108 and the current condition data 128, wherein the nearby road segments are placed less than a distance threshold value from the vehicle 100.

The method may further comprise obtaining 232 the forecasted condition data 130 from the remote server 106. The distant road segments of the road segments may be categorized by estimating 234 periods of time for the vehicle to reach the distant road segments, wherein the distant road segments are placed further away than the distance threshold value from a current position of the vehicle 100, and identifying 236 the forecasted condition data 130 for the distant road segments based on the periods of time. The distant road segments may be categorized as the ADS certified road segments and/or the road segments under ADS verification based on a combination of the ODD status data 108 and the forecasted condition data 130.

Executable instructions for performing these functions are, optionally, included in a non-transitory computer-readable storage medium or other computer program product configured for execution by one or more processors.

Figure 3:
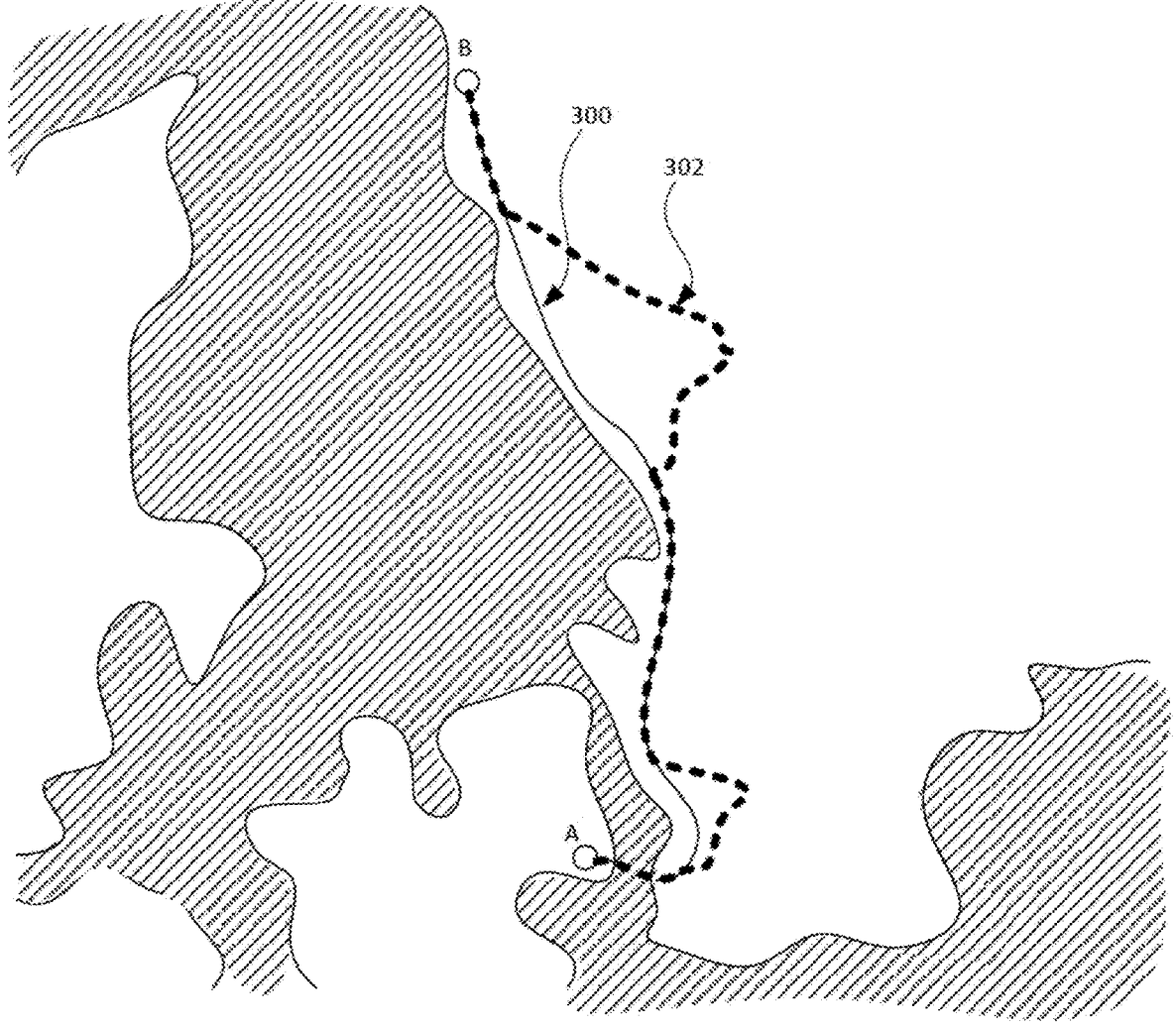
FIG. 3 illustrates an example of two route alternatives provided by a route planning module, wherein one of the alternatives is based on user road segment selection data, that is, data identified road segments deemed relevant for the user from an ODD expansion perspective in accordance with some embodiments.

FIG. 3 is an example of an output from the route planning module 124 provided via the GUI of the display apparatus 110. In this example, the user has requested the route planning module 124 to provide route options, sometimes referred to as route alternatives, from position A to position B. In addition to making this request, the user has also provided for that the user road segment selection data 120, that is, the road segments the user is interested in having ADS certified, is made available to the route planning module 124. One way for the user of providing for that this information is shared with the route planning module 124 is to confirm that he or she accepts that this information is shared with the route planning module 124 continuously. As illustrated, a shortest possible distance option 300 is provided as well as an ODD expansion route option 302. To provide for that there is a limit to how much the ODD expansion route option 302 is allowed to deviate in terms of distance from the shortest possible distance option 300, a detour threshold may be used. If using such detour threshold, the ODD expansion route option 302 is constrained to be no longer than the shortest possible distance option 300 plus the detour threshold. Instead of having a detour threshold based on distance, it is also an option to have the detour threshold being based on time and instead of having the shortest possible distance option 300 have a shortest possible travelling time option.

Figure 4:
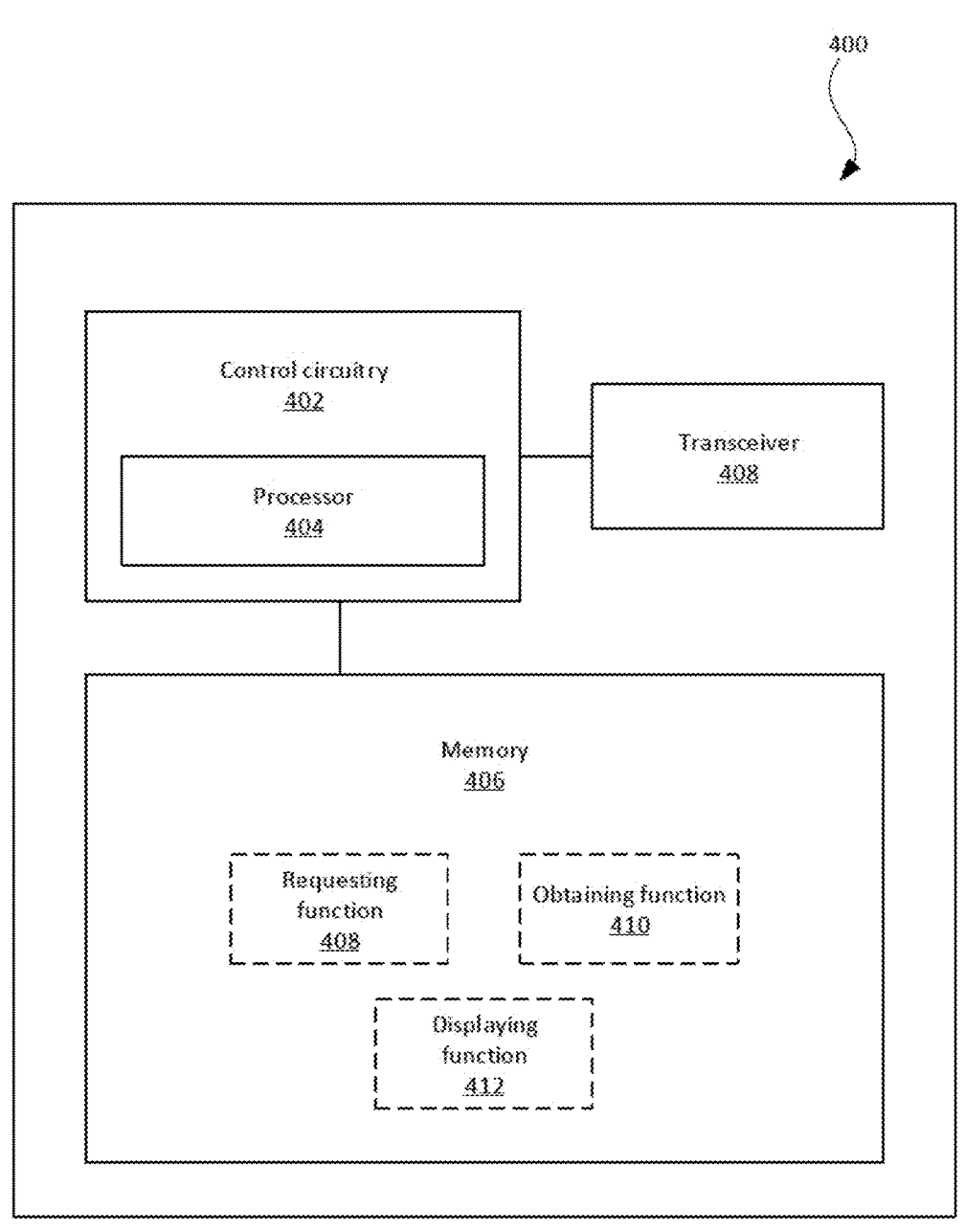
FIG. 4 illustrates a schematic block diagram representation of a system in accordance with some embodiments.

FIG. 4 is a schematic block diagram representation of a system 400 for managing user demand-based ODD expansion for an ADS of the vehicle 100. The system 400 comprises control circuitry 402, e.g. one or more processors 404, configured to perform the functions of the method 200 disclosed herein, where the functions may be included in a non-transitory computer-readable storage medium 406 or other computer program product configured for execution by the control circuitry 402. The system 400 can comprise a transceiver 408 for transmitting and/or receiving data from any device external to the system 400. In other words, the system 400 comprises one or more memory storage areas comprising program code, the one or more memory storage areas 12 and the program code configured to, with the one or more processors 404, cause the system to perform the method 200 according to any one of the embodiments disclosed herein. However, in order to better elucidate the herein disclosed embodiments, the control circuitry is represented as various "modules" or blocks in FIG. 4, each of them linked to one or more specific functions of the control circuitry.

A requesting function 408 can be provided for requesting the ODD verification completion rate for each of the plurality of road segments 102 by transferring the request 104 from the vehicle 100 to the remote server 106. An obtaining function 410 can be provided for obtaining 204 the road segment ODD status data 108, including the ODD verification completion rates, for the plurality of the road segments 102 from the remote server 106. A displaying function 412 can be provided for displaying, via the display apparatus 110, the graphical user interface GUI comprising the graphical representation described above.

Figure 5:
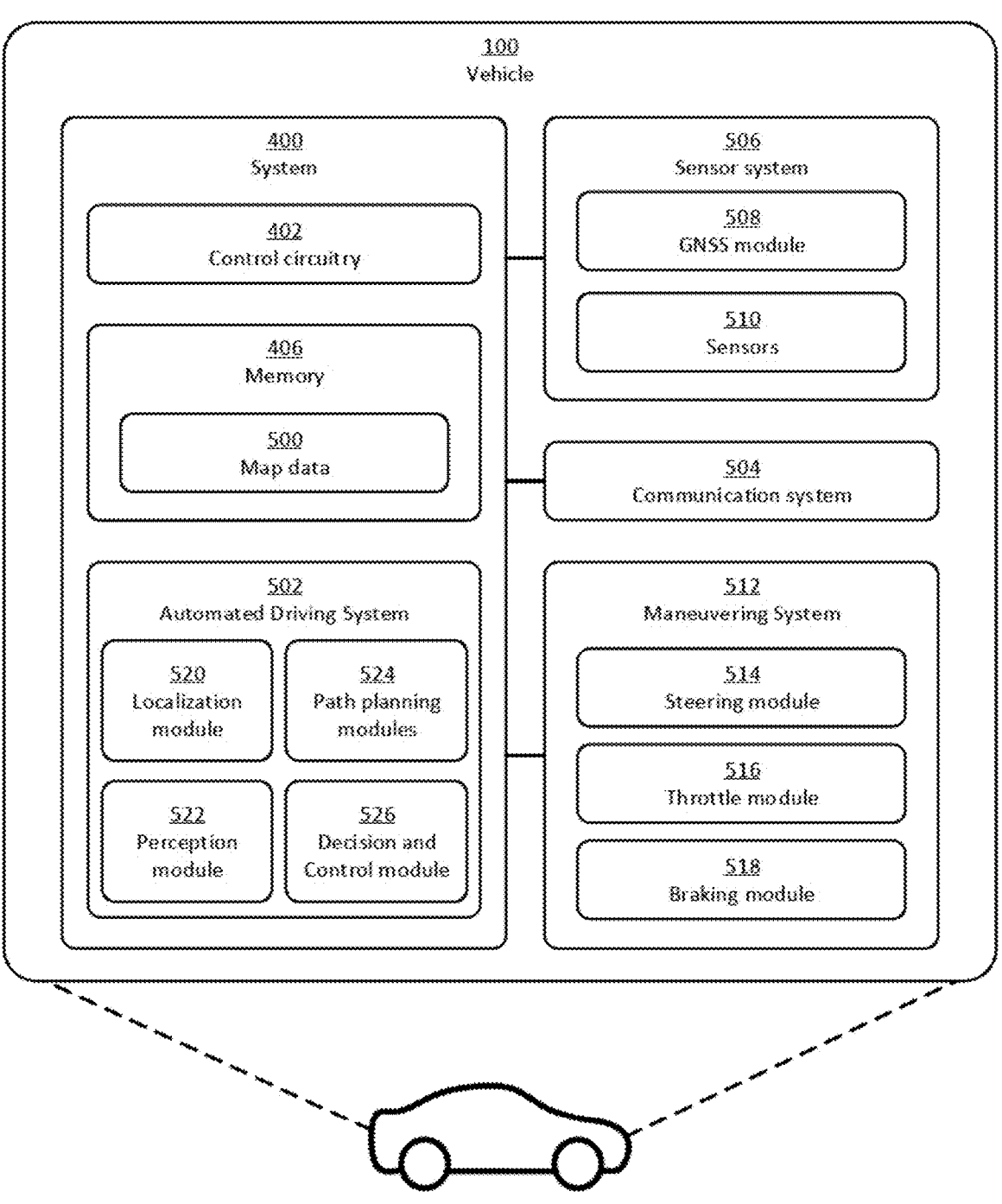
FIG. 5 schematically illustrates an ADS-equipped vehicle in accordance with some embodiments.

FIG. 5 is a schematic illustration of the ADS-equipped vehicle 100 comprising such system 400. As used herein, a "vehicle" is any form of motorized transport. For example, the vehicle 100 may be any road vehicle such as a car (as illustrated herein), a motorcycle, a (cargo) truck, a bus, etc.

The system 400 can comprise the control circuitry 402 and the memory 406. The control circuitry 402 may physically comprise one single circuitry device. Alternatively, the control circuitry 402 may be distributed over several circuitry devices. As an example, the system 400 may share its control circuitry 402 with other parts of the vehicle 100. Moreover, the system 400 may form a part of the ADS 310, i.e. the system 400 may be implemented as a module or feature of the ADS. The control circuitry 402 may comprise one or more processors, such as a central processing unit (CPU), microcontroller, or microprocessor. The one or more processors may be configured to execute program code stored in the memory 406, in order to carry out various functions and operations of the vehicle 100 in addition to the methods disclosed herein. The processor(s) may be or include any number of hardware components for conducting data or signal processing or for executing computer code stored in the memory 406. The memory 406 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 406 may include database components, object code components, script components, or any other type of information structure for supporting the various activities of the present description.

In the illustrated example, the memory 406 further stores map data 500. The map data 500 may for instance be used by an ADS 502 of the vehicle 100 in order to perform autonomous functions of the vehicle 100. The map data 500 may comprise high-definition (HD) map data. In some embodiments, the above-discussed graphical representation of the GUI may be provided as a map layer of a digital map, such as an HD map. Thus, the categorized road segments may be added as a layer in the digital map and displayed to the user.

It is contemplated that the memory 406, even though illustrated as a separate element from the ADS 502, may be provided as an integral element of the ADS 502. In other words, according to an exemplary embodiment, any distributed or local memory device may be utilized in the realization of the present inventive concept. Similarly, the control circuitry 402 may be distributed e.g. such that one or more processors of the control circuitry 402 is provided as integral elements of the ADS 502 or any other system of the vehicle 100. In other words, according to an exemplary embodiment, any distributed or local control circuitry device may be utilized in the realization of the present inventive concept. The ADS 502 is configured carry out the functions and operations of the autonomous or semi-autonomous functions of the vehicle 100. The ADS 502 can comprise a number of modules, where each module is tasked with different functions of the ADS 502.

The vehicle 100 can comprise a number of elements which can be commonly found in autonomous or semi-autonomous vehicles. It will be understood that the vehicle 1000 can have any combination of the various elements shown in FIG. 5. Moreover, the vehicle 100 may comprise further elements than those shown in FIG. 5. While the various elements is herein shown as located inside the vehicle 100, one or more of the elements can be located externally to the vehicle 100. For example, the map data may be stored in a remote server and accessed by the various components of the vehicle 100 via a communication system 504. Further, even though the various elements are herein depicted in a certain arrangement, the various elements may also be implemented in different arrangements, as readily understood by the skilled person. It should be further noted that the various elements may be communicatively connected to each other in any suitable way. The vehicle 100 of FIG. 5 should be seen merely as an illustrative example, as the elements of the vehicle 100 can be realized in several different ways.

The vehicle 100 further comprises a sensor system 506. The sensor system 506 can be configured to acquire sensory data about the vehicle itself, or of its surroundings. The sensor system 506 may for example comprise a Global Navigation Satellite System (GNSS) module 508 (such as a GPS) configured to collect geographical position data of the vehicle 100. The sensor system 506 may further comprise one or more sensors 510. The sensor(s) 510 may be any type of on-board sensors, such as cameras, LIDARs and RADARs, ultrasonic sensors, gyroscopes, accelerometers, odometers etc. It should be appreciated that the sensor system 506 may also provide the possibility to acquire sensory data directly or via dedicated sensor control circuitry in the vehicle 100.

The vehicle 100 can further comprise the communication system 504. The communication system 504 can be configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 504 may communicate using one or more communication technologies. The communication system 504 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 504 may accordingly provide the possibility to send output to a remote location (e.g. remote operator or control center) and/or to receive input from a remote location by means of the one or more antennas. Moreover, the communication system 504 may be further configured to allow the various elements of the vehicle 100 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 100 further comprises a maneuvering system 512. The maneuvering system 512 is configured to control the maneuvering of the vehicle 100. The maneuvering system 512 comprises a steering module 514 configured to control the heading of the vehicle 100. The maneuvering system 5112 further comprises a throttle module 516 configured to control actuation of the throttle of the vehicle 100. The maneuvering system 512 further comprises a braking module 518 configured to control actuation of the brakes of the vehicle 100. The various modules of the maneuvering system 512 may also receive manual input from a driver of the vehicle 100 (i.e. from a steering wheel, a gas pedal and a brake pedal respectively). However, the maneuvering system 512 may be communicatively connected to the ADS 502 of the vehicle, to receive instructions on how the various modules of the maneuvering system 512 should act. Thus, the ADS 502 can control the maneuvering of the vehicle 100, for example via the decision and control module 526.

The ADS 502 may comprise a localization module 520 or localization block/system. The localization module 520 is configured to determine and/or monitor a geographical position and heading of the vehicle 100, and may utilize data from the sensor system 512, such as data from the GNSS module 508. Alternatively, or in combination, the localization module 520 may utilize data from the one or more sensors 510. The localization system may alternatively be realized as a Real Time Kinematics (RTK) GPS in order to improve accuracy.

The ADS 502 may further comprise a perception module 522 or perception block/system 522. The perception module 522 may refer to any commonly known module and/or functionality, e.g. comprised in one or more electronic control modules and/or nodes of the vehicle 100, adapted and/or configured to interpret sensory data relevant for driving of the vehicle 100 to identify e.g. obstacles, vehicle lanes, relevant signage, appropriate navigation paths etc. The perception module 522 may thus be adapted to rely on and obtain inputs from multiple data sources, such as automotive imaging, image processing, computer vision, and/or in-car networking, etc., in combination with sensory data e.g. from the sensor system 506. The ADS 502 may also comprise path planning modules 524.

The localization module 520 and/or the perception module 522 may be communicatively connected to the sensor system 506 in order to receive sensory data from the sensor system 506. The localization module 520 and/or the perception module 522 may further transmit control instructions to the sensor system 510.

The present technology has been presented above with reference to specific embodiments. However, other embodiments than the above described are possible and within the scope of the present technology. Different method steps than those described above, performing the method by hardware or software, may be provided within the scope of the present technology. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 404 (associated with the control device, herein referred to as the system 400) may be or include any number of hardware components for conducting data or signal processing or for executing computer code stored in memory 406. The device has an associated memory 406, and the memory 406 may be one or more devices for storing data and/or computer code for completing or facilitating the various methods described in the present description. The memory may include volatile memory or non-volatile memory. The memory 406 may include database components, object code components, script components, or any other type of information structure for supporting the various activities of the present description. According to an exemplary embodiment, any distributed or local memory device may be utilized with the systems and methods of this description. According to an exemplary embodiment the memory 406 is communicably connected to the processor 404 (e.g., via a circuit or any other wired, wireless, or network connection) and includes computer code for executing one or more processes described herein.

Accordingly, it should be understood that parts of the described solution may be implemented either in the vehicle 100, in a system located external the vehicle 100, or in a combination of internal and external the vehicle; for instance in a server in communication with the vehicle, a so called cloud solution. For instance, sensor data may be sent to an external system and that system performs the steps to compare the sensor data (movement of the other vehicle) with the predefined behaviour model. The different features and steps of the embodiments may be combined in other combinations than those described.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of receiving signals comprising information about a movement and information about a current road scenario may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A computer-implemented method for managing user demand-based Operational Design Domain (ODD) expansion for an Automated Driving System (ADS) of a vehicle, the method comprising:

requesting an ODD verification completion rate for each of a plurality of road segments by transferring a request from the vehicle to a remote server, obtaining road segment ODD status data, including the ODD verification completion rates, for the plurality of the road segments from the remote server, displaying, via a display apparatus, a graphical user interface (GUI) comprising:

a graphical representation comprising:

categorized road segments comprising at least road segments under ADS verification, wherein the categorized road segments comprise the plurality of road segments categorized based on the road segment ODD status data, and guide marks associated with a sub-set of the road segments under ADS verification, wherein one defining criteria for the sub-set is an ODD verification completion rate range.

2. The method according to claim 1, wherein the road segment ODD status data further comprises, for each of the plurality of road segments, a number of users registered thereto, the graphical representation further comprising:

the number of users registered to at least one road segment of the sub-set of the road segments under ADS verification.

3. The method according to claim 1, further comprising:

registering a user to at least one of the plurality of road segments by obtaining user identification data, obtaining user road segment selection data, wherein the user road segment selection data pertains to the at least one of the plurality of road segments, and uploading the user identification data and the user road segment selection data to the remote server.

4. The method according to claim 3, further comprising in case one of the at least one of the plurality of road segments linked to the user road segment selection data is subject to a change of category, notifying the change of category by updating the graphical representation so to reflect the change of category.

5. The method according to claim 4, further comprising:

obtaining an invitation to join a user group, wherein the user group is linked to a user-group sub-set of the road segments under ADS verification, in case the invitation is accepted, linking the user identification data to the user group, and in case one of the user-group sub-set of road segments linked to the user group is subject to a change of category, notifying the change of category by updating the graphical representation so to reflect the change of category.

6. The method according to claim 3, further comprising:

transferring the user road segment selection data together with the user identification data to a route planning module such that route planning performed by the route planning module is at least partly based on the user road segment selection data.

7. The method according to claim 6, wherein the route planning module is configured to provide, based on a user request for a route from a first position to a second position, an ODD expansion route option if a route distance difference between the ODD expansion route option and a shortest possible distance option is below a detour threshold.

8. The method according to claim 1, further comprising:

obtaining image overlay data based on the ODD verification completion rates for each of the road segments under ADS verification; and applying the image overlay data to a digital map area such that an ODD verification progress map area can be provided, wherein the ODD verification progress map area is the map area combined with the image overlay data.

9. The method according to claim 1, wherein the road segment ODD status data comprises ODD verification completion rates for different conditions, including wind conditions, rain conditions, light conditions and/or temperature conditions, the method further comprising obtaining current condition data from the vehicle and/or the remote server, and wherein nearby road segments of the road segments are categorized as the road segments under ADS verification based on a combination of the road segment ODD status data and the current condition data, wherein the nearby road segments are placed less than a distance threshold value from the vehicle.

10. The method according to claim 9, further comprising:

obtaining forecasted condition data from the remote server, and wherein distant road segments of the road segments are categorized by estimating periods of time for the vehicle to reach the distant road segments, wherein the distant road segments are placed further away than the distance threshold value from a current position of the vehicle, and identifying the forecasted condition data for the distant road segments based on the periods of time, wherein the distant road segments are categorized as the road segments under ADS verification based on a combination of the road segment ODD status data and the forecasted condition data.

11. The method according to claim 1, the graphical representation further comprising:

for at least one of the road segments under ADS verification, a number of trips with the vehicle that is determined as required for transforming into a road segment being ADS certified.

12. The method according to claim 1, wherein the vehicle is provided with different types of sensors, wherein from which types of sensors data transfer is activated at a point of time depends on the ODD completion rate for the road segment in which the vehicle is placed at the point of time.

13. A non-transitory computer readable storage medium storing instructions which, when executed by a computing device, causes the computer to carry out the method according to claim 1.

14. An apparatus for managing user demand-based Operational Design Domain (ODD) expansion for an Automated Driving System (ADS) of a vehicle, the apparatus comprising control circuitry configured to: request an ODD verification completion rate for each of a plurality of road segments by transferring a request from the vehicle to a remote server, obtain road segment ODD status data, including the ODD verification completion rates, for the plurality of the road segments from the remote server, display, via a display apparatus, a graphical user interface (GUI) comprising: a graphical representation of a digital map area comprising: categorized road segments comprising at least road segments under ADS verification, wherein the categorized road segments comprises the plurality of road segments categorized based on the road segment ODD status data, and guide marks associated with a sub-set of the road segments under ADS verification, wherein one defining criteria for the sub-set is an ODD verification completion rate range.

15. A vehicle comprising:

an automated driving system (ADS); and an apparatus for managing user demand-based Operational Design Domain (ODD) expansion according to claim 14 for the ADS of the vehicle.

*  *  *  *  *